United States Patent
Chen

(10) Patent No.: US 11,810,297 B2
(45) Date of Patent: *Nov. 7, 2023

(54) COMPUTER AIDED DIAGNOSIS SYSTEM FOR DETECTING TISSUE LESION ON MICROSCOPY IMAGES BASED ON MULTI-RESOLUTION FEATURE FUSION

(71) Applicant: TENCENT AMERICA LLC, Palo Alto, CA (US)

(72) Inventor: Hanbo Chen, Seattle, WA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/728,320

(22) Filed: Apr. 25, 2022

(65) Prior Publication Data

US 2022/0245809 A1  Aug. 4, 2022

Related U.S. Application Data

(63) Continuation of application No. 16/670,321, filed on Oct. 31, 2019, now Pat. No. 11,341,635.

(51) Int. Cl.
*G06T 7/11* (2017.01)
*G06V 10/764* (2022.01)
(Continued)

(52) U.S. Cl.
CPC ............ *G06T 7/0012* (2013.01); *G06F 18/24* (2023.01); *G06N 3/045* (2023.01); *G06T 7/11* (2017.01);
(Continued)

(58) Field of Classification Search
CPC ........ G06F 18/253; G06N 3/045; G06N 3/08; G06T 19/006; G06T 2200/24; G06T 2207/10056; G06T 2207/20016; G06T 2207/20081; G06T 2207/20084; G06T 2207/30024; G06T 2207/30096; G06T 7/0012; G06T 7/11; G06V 10/764;
(Continued)

(56) References Cited

U.S. PATENT DOCUMENTS 9,589,374 B1  3/2017  Gao et al.
10,304,193 B1  5/2019  Wang et al.
(Continued)

FOREIGN PATENT DOCUMENTS

CA  3 067 824 A1  1/2019
CA  3067824 A1 *  1/2019  ........... G06K 9/4628
(Continued)

OTHER PUBLICATIONS

Office Action dated Sep. 12, 2022 in Japanese Application No. 2021-564174.
(Continued)

*Primary Examiner* — Tsung Yin Tsai
(74) *Attorney, Agent, or Firm* — Sughrue Mion, PLLC

(57) ABSTRACT

Embodiments of the present disclosure include a method, device and computer readable medium involving receiving image data to detect tissue lesions, passing the image data through at least one first convoluted neural network, segmenting the image data, fusing the segmented image data, and detecting tissue lesions.

20 Claims, 5 Drawing Sheets

(51) Int. Cl.
- G06T 7/00 (2017.01)
- G06T 19/00 (2011.01)
- G06F 18/24 (2023.01)
- G06N 3/045 (2023.01)
- G06V 10/80 (2022.01)
- G06V 10/82 (2022.01)
- G06V 20/69 (2022.01)

(52) U.S. Cl.
CPC .......... *G06T 19/006* (2013.01); *G06V 10/764* (2022.01); *G06V 10/806* (2022.01); *G06V 10/82* (2022.01); *G06V 20/695* (2022.01); *G06V 20/698* (2022.01); *G06T 2207/10056* (2013.01); *G06T 2207/20081* (2013.01); *G06T 2207/20084* (2013.01); *G06T 2207/30024* (2013.01)

(58) Field of Classification Search
CPC .... G06V 10/806; G06V 10/82; G06V 20/695; G06V 20/698
See application file for complete search history.

(56) References Cited

U.S. PATENT DOCUMENTS

| | | | |
|---|---|---|---|
| 10,420,523 B2* | 9/2019 | Hoogi | G06T 7/12 |
| 11,250,563 B2* | 2/2022 | Chen | G06T 7/0012 |
| 2015/0213302 A1 | 7/2015 | Madabhushi et al. | |
| 2015/0347822 A1 | 12/2015 | Zhou et al. | |
| 2017/0124409 A1 | 5/2017 | Choi et al. | |
| 2017/0270664 A1* | 9/2017 | Hoogi | A61B 6/5217 |
| 2017/0277981 A1 | 9/2017 | Zhou et al. | |
| 2019/0065884 A1* | 2/2019 | Li | G06V 10/764 |
| 2019/0206056 A1* | 7/2019 | Georgescu | G06N 3/045 |
| 2019/0279051 A1 | 9/2019 | Martinello et al. | |
| 2020/0167928 A1* | 5/2020 | Heindl | A61B 5/055 |
| 2020/0226748 A1* | 7/2020 | Kaufman | G06F 18/254 |

FOREIGN PATENT DOCUMENTS

| | | | | |
|---|---|---|---|---|
| JP | 2019-160303 A | 9/2019 | | |
| JP | 2019-530488 A | 10/2019 | | |
| WO | 2018/026431 A1 | 2/2018 | | |
| WO | 2018/229490 A1 | 12/2018 | | |
| WO | WO-2018229490 A1 * | 12/2018 | ......... | G06N 3/0454 |
| WO | 2019005722 A1 | 1/2019 | | |
| WO | WO-2019005722 A1 * | 1/2019 | ......... | G06K 9/4628 |

OTHER PUBLICATIONS

International Search Report dated Nov. 18, 2020 in International Application No. PCT/US2020/047134.

Written Opinion of the International Searching Authority dated Nov. 18, 2020 in Application No. PCT/US2020/047134.

Patrick Ferdinand Christ et al., "Automatic Liver and Lesion Segmentation in CT Using Cascaded Fully Convolutional Neural Networks and 3D Conditional Random Fields", arXiv:1610.02177v1(cs.CV), Oct. 2016, pp. 1-8.

Liang Chen et al., "Fully automatic acute ischemic lesion segmentation in DWI using convolutional neural networks", NeuroImage: Clinical, vol. 15, 2017, pp. 633-643.

* cited by examiner

COMPUTER AIDED DIAGNOSIS SYSTEM FOR DETECTING TISSUE LESION ON MICROSCOPY IMAGES BASED ON MULTI-RESOLUTION FEATURE FUSION

CROSS-REFERENCE TO RELATED APPLICATION

This application is a continuation application of U.S. patent application Ser. No. 16/670,321, filed on Oct. 31, 2019, the disclosure of which is incorporated herein by reference.

BACKGROUND OF THE INVENTION

Recently, different computer-aided diagnosis (CAD) systems have been proposed to automatically or semi-automatically classify, detect, and segment tissue lesions from medical images. Such proposed systems can assist doctors to increase their throughput and improve diagnosis quality. Some fully-automatic system can also work alone to pre-diagnosis or offer second opinions. Such systems may also reduce healthcare costs and improve the wellness of patients.

Traditional CAD systems have been designed based on human designed algorithms and rules. Such system offer easy interpretation but limited performance. More recently, CAD systems have included integrating machine learning models such as convolutional neural networks (CNNs) or other deep learning methods. Machine learning models require a large amount of training. However, once there is sufficient training data, CAD systems which have integrated machine learning models can give expert level diagnosis, and may sometimes even outperform human experts.

However, most existing CAD systems directly adopt machine learning models designed for non-clinical tasks—such as hand-writing detection or photo classification. There has yet to be a CAD system designed to detect tissue lesions under a microscope.

Doctors need real-time response from CAD systems. However, large images with high resolutions are difficult to be processed in real time.

Further, doctors usually first inspect tissue images in small magnitude (e.g. 4× magnitude), and then switch to a higher zoom lens (e.g. 10×, 20×, and 40× magnitude) to inspect tissue images in a higher level of detail (resolution scales). Diagnosis is usually based on fused information from different scales. No existing system can fuse the information from different scales for diagnosis.

When whole pieces of tissue are too large to be inspected under a microscope in a single shot, doctors must move the slide around to inspect different parts thereof. No existing system is designed to fuse such global information.

Typically, CNN processed images are based on local features which can be confusing for tissue images. For instance, dark stains of nuclei is a feature of a cancer cell. However, due to processing variabilities, the stain of some slices may be darker overall. By only looking at local information however, it is difficult for doctors to make the correct decision for such slices.

Further, typical CNNs are sensitive to the size of an object in an image, while the size of the same object such as nuclei varies in different magnitudes. One proposed solution to address this is to train separate CNN models for each resolution. However, this would significantly increase the size of model and the computation cost. Another proposed solution is to fuse the training samples of different magnitudes and to train one model for different resolutions. However, this approach can cause a decrease in performance of the CNN.

Disclosures herein address the problems discussed above, and propose an efficient system to detect cell-level tissue lesions from microscope images. Further, this disclosure proposes a modified CNN to enabled integration of global information when conducting computations. Further still, this modified CNN deals with different resolutions independently with a single model so as to reduce the computational cost without sacrificing performance.

SUMMARY OF THE INVENTION

Herein is disclosed a CAD system to automatically detect lesion on microscopy images. The system may take enlarged tissue images such as MSI or WSI as input and automatically processes the images to identify lesion or abnormal tissues such as cancer cells on the image. The system may segment the lesion region and classify the lesion into subtypes. Different from conventional systems, the herein disclosed system may process images hierarchically and is capable of fusing information from different scales. The disclosed system is also consistent with doctors' and pathologists' common practice: inspect the tissue in different scales by switching the magnification of the lenses.

According to an aspect of an embodiment, there is provided a method for detecting tissue lesions, including receiving image data from a user interface, the image data including raw image data, passing the image data through at least one first convoluted neural network thereby generating first convoluted neural network features based on the image data and first image segmentation data based on the image data, passing the first convoluted neural network features and the first image segmentation data through at least one second convoluted neural network thereby concatenating and weighting the first image segmentation data and generating second image segmentation data, and analyzing the second image segmentation data thereby detecting tissue lesions if present.

According to another aspect of an embodiment, the image data may include a plurality of resolution scales, and the first convoluted neural network features may include features independently computed for each of the resolution scales in the plurality of resolution scales.

According to another aspect of an embodiment, the first image segmentation data may be course segmentation data, which may be smaller than the raw image data, and each pixel of the course segmentation data may indicate a class of corresponding areas in the raw image data.

According to another aspect of an embodiment, the first image segmentation data may be computed based on a single image.

According to another aspect of an embodiment, the first image segmentation data may be weighted by passing global features from different image views and scales to create a multi-layered perception.

According to another aspect of an embodiment, the passing the image data through the at least one first convoluted neural network, the passing the first convoluted neural network features and the first image segmentation data through the at least one second convoluted neural network, and the analyzing may be performed in real time.

According to another aspect of an embodiment, the received image data may be from either or both of a microscopy image or a whole-slide image.

According to another aspect of an embodiment, the method may further comprise classifying the detected tissue lesions into sub-categories.

According to another aspect of an embodiment, the method may further comprise displaying analysis results.

According to another aspect of an embodiment, the analysis results may be displayed on a computer or via augmented reality.

According to another aspect of an embodiment, there is provided an apparatus comprising: at least one memory configured to store computer program code; and at least one processor configured to access the at least one memory and operate according to the computer program code, the computer program code comprising: receiving code configured to cause the at least one processor to receive image data from a user interface, the image data including raw image data, first passing code configured to cause the at least one processor to pass the image data through at least one first convoluted neural network thereby generating first convoluted neural network features based on the image data and first image segmentation data based on the image data, second passing code configured to cause the at least one processor to pass the first convoluted neural network features and the first image segmentation data through at least one second convoluted neural network thereby concatenating and weighting the first image segmentation data and generating second image segmentation data, and analyzing code configured to cause the at least one processor to analyze the second image segmentation data thereby detecting tissue lesions if present.

According to another aspect of an embodiment, the image data may include a plurality of resolution scales, and the first convoluted neural network features may include features independently computed for each of the resolution scales in the plurality of resolution scales.

According to another aspect of an embodiment, the first image segmentation data may be course segmentation data, which may be smaller than the raw image data, and each pixel of the course segmentation data may indicate a class of corresponding areas in the raw image data.

According to another aspect of an embodiment, the first passing code may be further configured to compute the first image segmentation data based on a single image.

According to another aspect of an embodiment, the second passing code may be further configured to weight the first image segmentation data by passing global features from different image views and scales to create a multi-layered perception.

According to another aspect of an embodiment, the receiving code, the first passing code, and the second passing code may be configured to be operated in real time.

According to another aspect of an embodiment, the received image data may be from either or both of a microscopy image or a whole-slide image.

According to another aspect of an embodiment, the computer program code may further comprise classifying code configured to cause the at least one processor to classify the detected tissue lesions into sub-categories.

According to another aspect of an embodiment, the computer code may further comprise displaying code configured to cause the at least one processor to display analysis results.

According to another aspect of an embodiment, there is provided a non-transitory computer-readable medium storing instructions, the instructions comprising: one or more instructions that, when executed by one or more processors of a device, cause the one or more processors to: receive image data from a user interface, the image data including raw image data, pass the image data through at least one first convoluted neural network thereby generating first convoluted neural network features based on the image data and first image segmentation data based on the image data, pass the first convoluted neural network features and the first image segmentation data through at least one second convoluted neural network thereby concatenating and weighting the first image segmentation data and generating second image segmentation data, and analyze the second image segmentation data thereby detecting tissue lesions if present.

DETAILED DESCRIPTION OF THE INVENTION

To make the objectives, technical solutions, and advantages of this application be more clear and comprehensible, embodiments will be further described in detail with reference to the accompany drawings. It should be understood that, the specific implementations described herein are only used for interpreting this application, rather than limiting this application.

Figure 1:
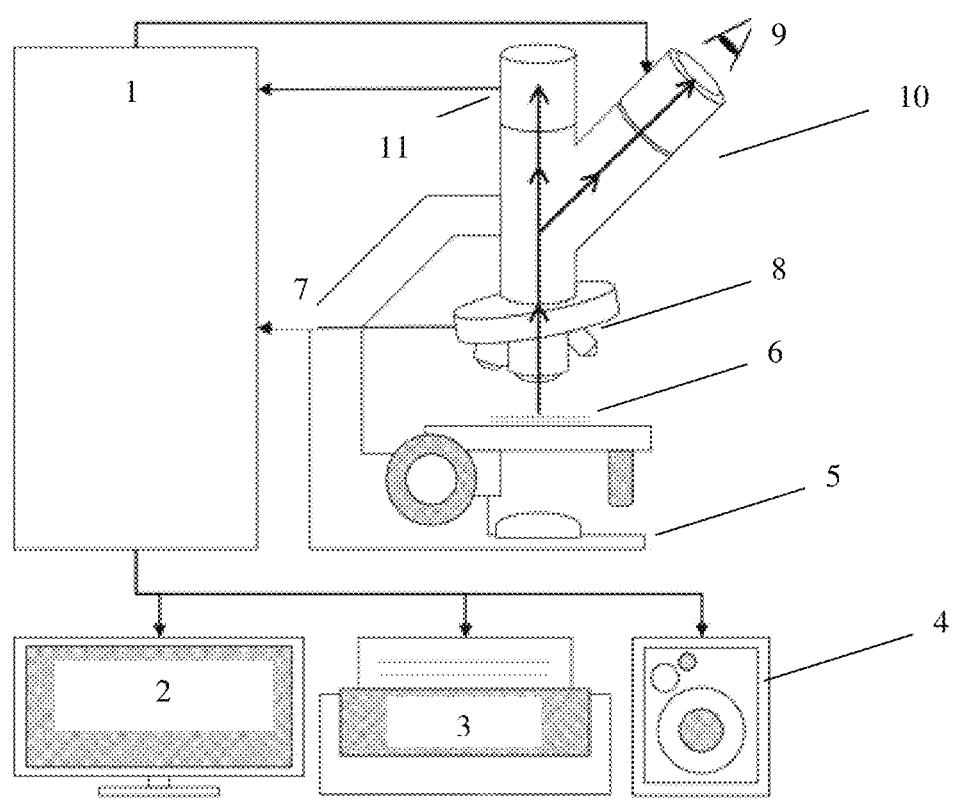
FIG. 1 is a diagram of an environment in which methods, apparatuses and systems described herein may be implemented, according to embodiments.

FIG. 1 is a schematic diagram of an application environment of a computer aided diagnosis system for detecting tissue lesions on microscopy images based on multi-resolution feature fusion. As shown in FIG. 1, camera 11 may capture a view under a microscope 5. A computer 1 may compute and generate graphics based on the image captured. A user may observe the tissue slide 6 under the microscope 5. Feedback on the computation result may be stored and displayed on computer monitor 2, or augmented reality monitor 10 on the microscope 5, or provided as computer-generated speech, or printed on paper provided by printer 3.

When a new slide is loaded, the system may start collecting photos of the tissue under microscope 5. Together, the parameter of the zoom lens that the photo is acquired with may be sent to the computer 1. The system may fuse this information and generate a diagnosis. The diagnosis may include: type of tissue, whether there are abnormal findings, type of abnormal findings such as cancer, photos of abnormal findings, and regions of abnormal findings on the photo.

The system component illustrated in FIG. 1 may consist of the following: microscope 5 the device to zoom and inspect the slide 6. The microscope 5 may send a signal to the computer 1 to instruct the computer on which objective lens is currently in use when the objective lens is switched or the computer 1 sends a request signal for such information. Digital camera 11 may be installed on the lens tube to capture the view under microscope 5. Augmented reality (AR) lens 10 may be installed on the ocular to overlay the virtual screen on top of the view of the slide 6. Computer 1 may be an image computation and data storage device.

Microphone (not shown) may be a voice input device for the user to control the system. Monitor 2 may display results. Printer 3 may print the results. Speaker 4 may provide computer-generated speech.

The core of the system may be an image processing system that can fuse the information from different views and different scales. An implementation of the system is shown in FIG. 3.

Figure 3:
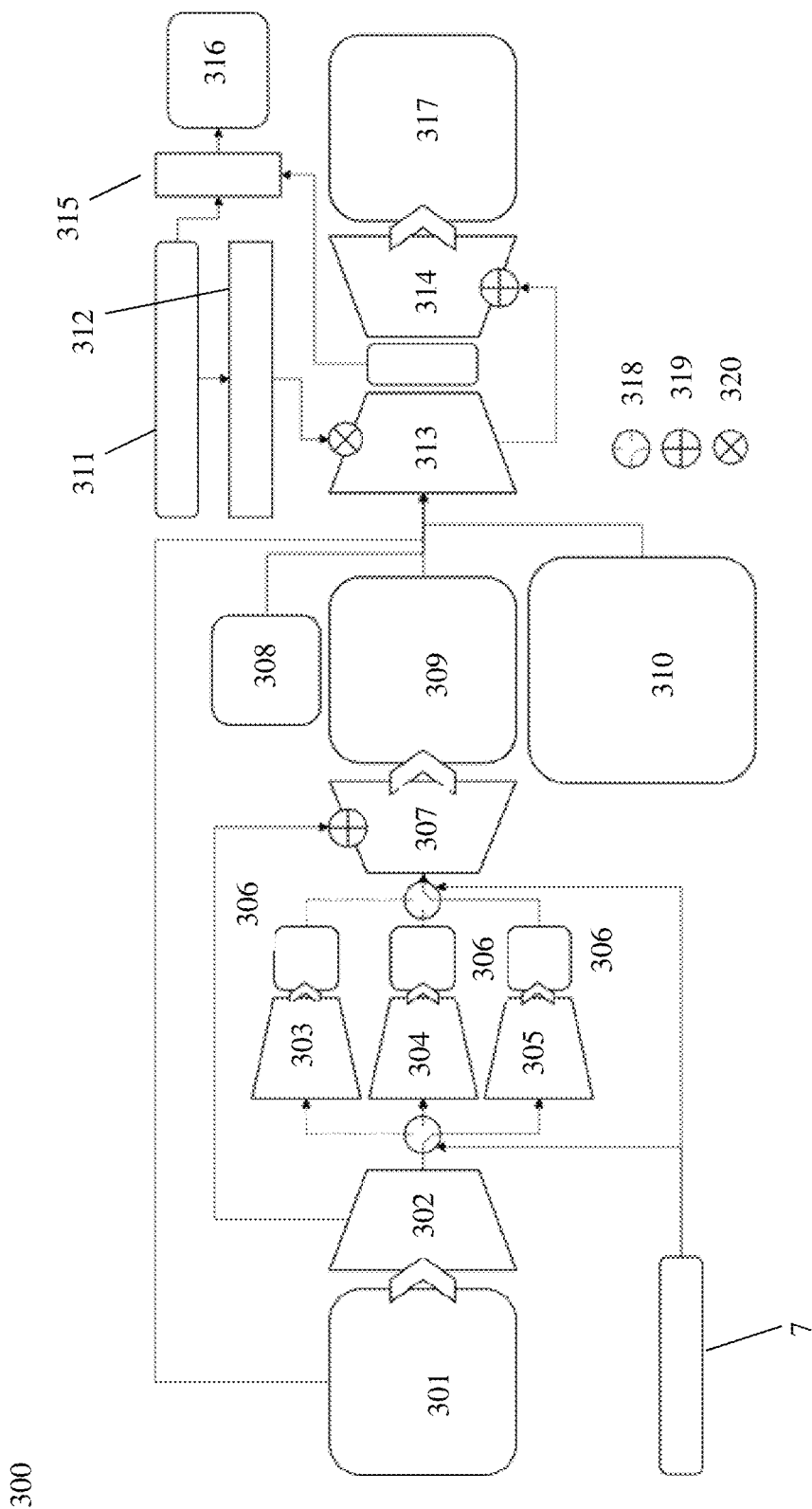
FIG. 3 is an illustration of an embodiment of the methods, apparatuses and systems described herein.

FIG. 3. is an illustration of the disclosed multi-scale multi-view microscopy image processing system 300. This system is composed of multiple CNNs (trapezoid) and multi layer perceptrons (rectangle). Rounded corner rectangles indicate the input and output data of the system 300. Arrows indicates data flow inside the system 300.

Figure 2:
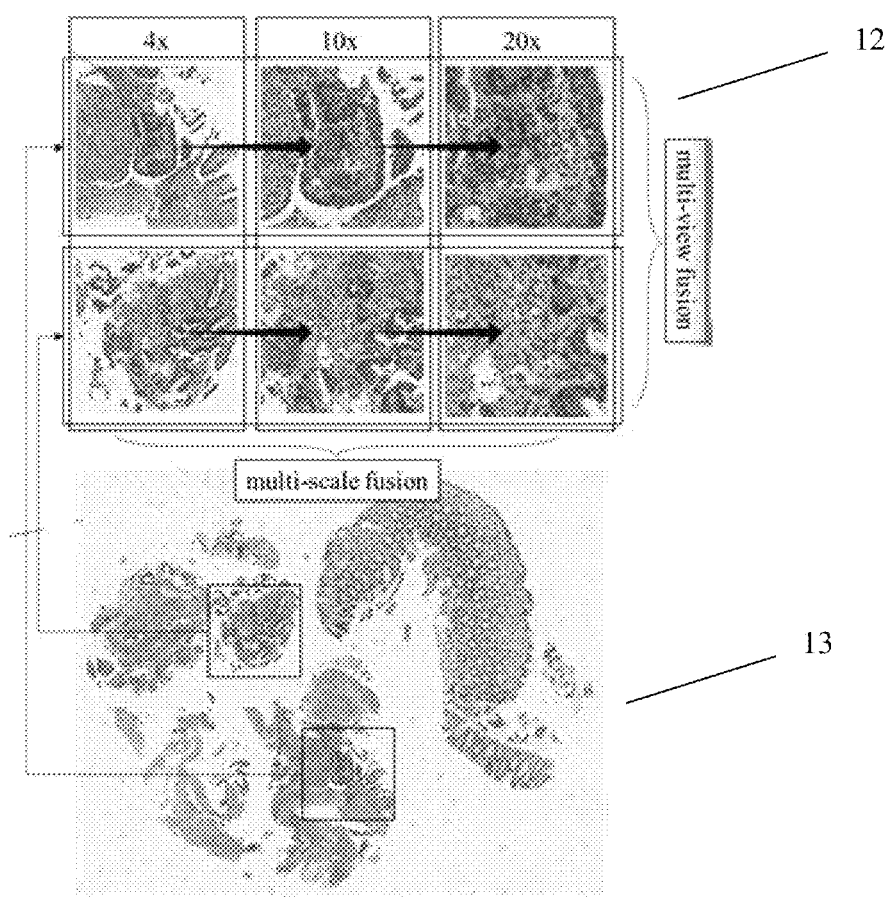
FIG. 2 is an illustration of an environment provided by an implementation of apparatuses and systems described herein.

As illustrated in FIG. 2, the system may include a cascade of CNNs. An Image may firstly be passed into CNN_A 302 to compute low order features. Then for each resolution scale, a CNN_Bi 303 may be independently computed. Depending on the scale of the image (given by Lens Param 7), the low order features may be passed to the corresponding CNN_Bi 303-305 to compute coarse segmentation. The coarse segmentation may be smaller than the raw image and each pixel may indicate the class of the corresponding areas on the raw image. CNN_C 307 may recover the spatial resolution of the coarse segmentation to generate the initial segmentation. The low order features in CNN_A 302 may be copied and concatenated into CNN_C 307 to help recover the resolution. The initial segmentation may be computed purely based on a single image without any context information. Then it may be refined by fusing the information from other views and other scales.

Here, the initial segmentation may be concatenated with the raw image. If available, the resampled segmentation from lower and higher resolution scales may be concatenated as well. Then the concatenated image may be passed into CNN_D 313 and CNN_E 314 to compute the final segmentation. In CNN_D 313, the convolution layers may be weighted. The weight may be computed by passing the global features from other views and other scales into multi-layer perceptron. The convolutional features computed by CNN_D 313 may be taken as the representative features of the image and fused with global features for further usage.

The proposed image processing system may also be extended to process a large image in real time. For MSI, the image is usually very large. It may take a typical CNN a few seconds to finish processing the whole image. And thus, there is a waiting time to get the result which may harm user experience. However, with the instantly disclosed system, the image may be first down-sampled into a low resolution scale but being small enough to be computable in real time.

After the computation finishes, the result may be displayed immediately so the user can get quick feedback. Then the system may start processing the raw but high-resolution image piece by piece while updating the result simultaneously. In this way, the user can keep receiving updated results in real time. In addition, by fusing the features and segmentations computed in low resolution, the result will be more accurate then directly processing the raw image.

Figure 5:
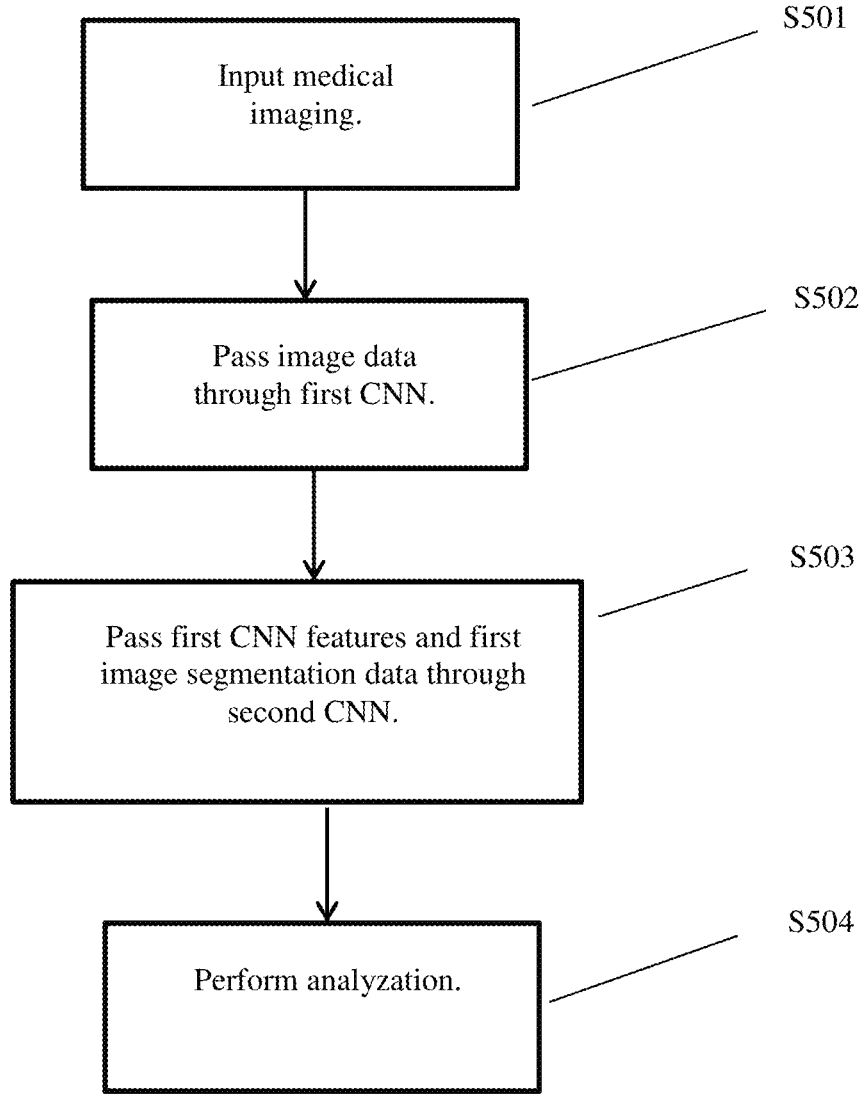
FIG. 5 shows a flowchart according to embodiments of the present disclosure.

FIG. 5 shows a flowchart 500 according to embodiments of the present disclosure. Advantageously, the flowchart 500 illustrates an ability to automatically detect a tissue lesion on microscopy images based on mutli-resolution feature fusion.

At S501, medical imaging is input from a user interface. At S502 the image data of the medical imaging is passed through at least one first CNN thereby generating first CNN features based on the image data and first image segmentation data based on the image data. At S503, the first convoluted neural network features and the first image segmentation data are passed through at least one second convoluted neural network thereby concatenating and weighting the first image segmentation data and generating second image segmentation data. At S504, analyzation is performed on the second image segmentation data thereby detecting tissue lesions if present.

According to certain advantages offered by the instant disclosure, the disclosed system can classify, localize, and segment lesions on microscopy images in real time. It can improves traditional CNNs to fuse previous observations of different views and in different scales on the same slide. It can reduce the cost of training separate CNNs for different scales without loss in accuracy.

Further, the disclosed system can process large images hierarchically and update results simultaneously with the computation steps. Thus, the user does not need to wait for the computation finish to inspect the result. Instead, the user can first get a coarse result and then the display will keep updating the refined result until the computation finishes.

In addition, the network architecture can be modified by adding or reducing convolutional layers. Also, the disclosed system may be extended to process other type of large image data such as satellite remote sensing images.

The techniques disclosed herein, can be implemented as computer software using computer-readable instructions and physically stored in one or more computer-readable media. For example, FIG. 4 shows a computer system 400 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 4:
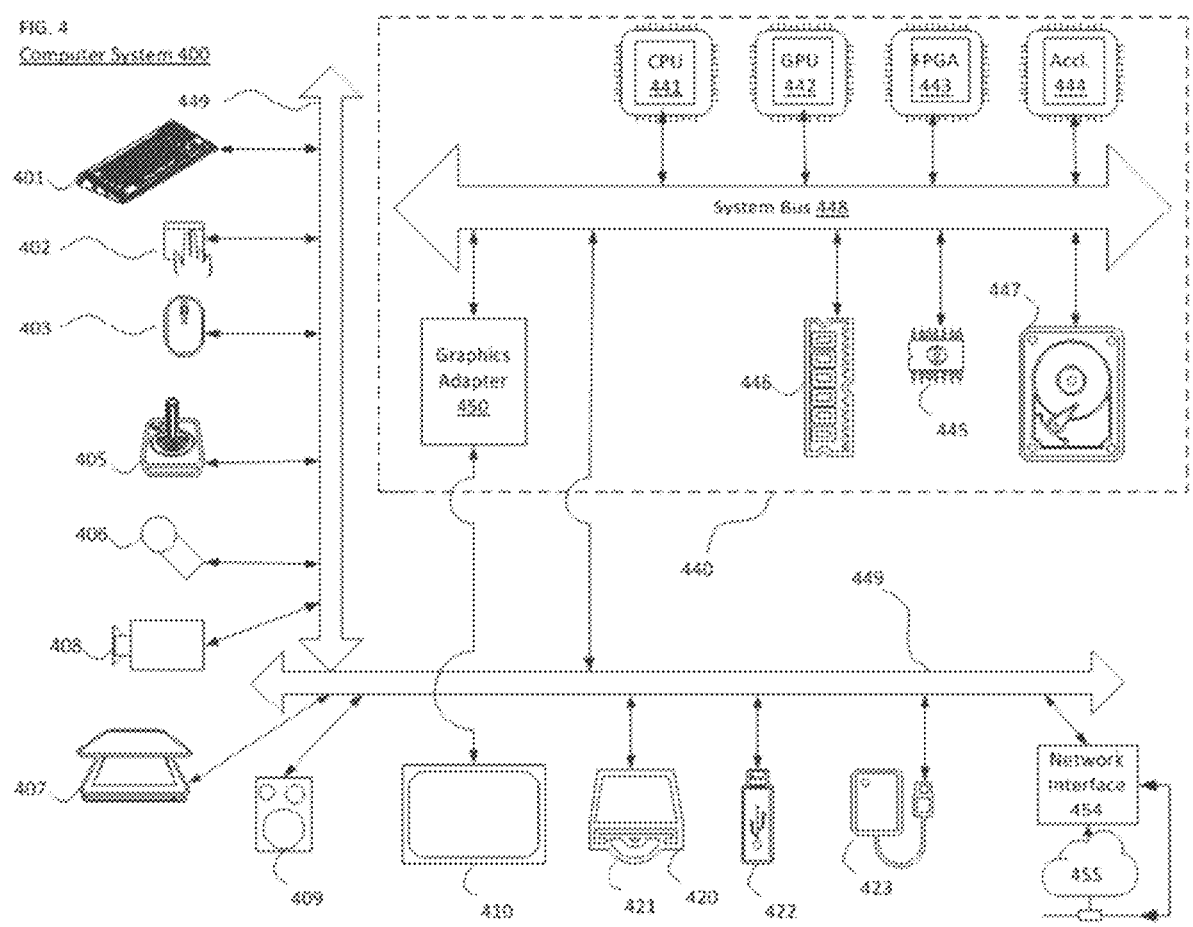
FIG. 4 is an illustration 400 of various components according to embodiments of the present disclosure.

The components shown in FIG. 4 for computer system 400 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 400.

Computer system 400 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 401, mouse 402, trackpad 403, touch screen 410, joystick 405, microphone 406, scanner 407, and camera 408. The camera 408 may be x-ray equipment, or other medical technology, for cardiac computed tomography from which the image of S101 or S501 may be obtained for example.

Computer system 400 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 410, or joystick 405, but there can also be tactile feedback devices that do not serve as input devices), audio output devices (such as: speakers 409, headphones (not depicted)), visual output devices (such as screens 410 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 400 can also include human accessible storage devices and their associated media such as optical media including CD/DVD ROM/RW 420 with CD/DVD or the like media 421, thumb-drive 422, removable hard drive or solid state drive 423, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 400 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general-purpose data ports or peripheral buses (449) (such as, for example USB ports of the computer system 400; others are commonly integrated into the core of the computer system 400 by attachment to a system bus as described below (for example Ethernet interface into a PC computer system or cellular network interface into a smartphone computer system). Using any of these networks, computer system 400 can communicate with other entities. Such communication can be uni-directional, receive only (for example, broadcast TV), uni-directional send-only (for example CANbusto certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 440 of the computer system 400.

The core 440 can include one or more Central Processing Units (CPU) 441, Graphics Processing Units (GPU) 442, specialized programmable processing units in the form of Field Programmable Gate Areas (FPGA) 443, hardware accelerators for certain tasks 444, and so forth. These devices, along with Read-only memory (ROM) 145, Random-access memory 446, internal mass storage such as internal non-user accessible hard drives, SSDs, and the like 447, may be connected through a system bus 448. In some computer systems, the system bus 448 can be accessible in the form of one or more physical plugs to enable extensions by additional CPUs, GPU, and the like. The peripheral devices can be attached either directly to the core's system bus 448, or through a peripheral bus 449. Architectures for a peripheral bus include PCI, USB, and the like.

CPUs 441, GPUs 442, FPGAs 443, and accelerators 444 can execute certain instructions that, in combination, can make up the aforementioned computer code. That computer code can be stored in ROM 445 or RAM 446. Transitional data can also be stored in RAM 446, whereas permanent data can be stored for example, in the internal mass storage 447. Fast storage and retrieve to any of the memory devices can be enabled through the use of cache memory, that can be closely associated with one or more CPU 441, GPU 442, mass storage 447, ROM 445, RAM 446, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 400, and specifically the core 440 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 440 that are of non-transitory nature, such as core-internal mass storage 447 or ROM 445. The software implementing various embodiments of the present disclosure can be stored in such devices and executed by core 440. A computer-readable medium can include one or more memory devices or chips, according to particular needs. The software can cause the core 740 and specifically the processors therein (including CPU, GPU, FPGA, and the like) to execute particular processes or particular parts of particular processes described herein, including defining data structures stored in RAM 446 and modifying such data structures according to the processes defined by the software. In addition or as an alternative, the computer system can provide functionality as a result of logic hardwired or otherwise embodied in a circuit (for example: accelerator 444), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

A partial list of the reference numerals present in the drawings is presented below:
1: computer,
2: monitor,
3: printer.
4: speaker,
5: microscope, 6: tissue slide,
7: lens Param,
8: zoom lens,
9: observer,
10: augmented reality device,
11: camera,
12: multi-view fusion,
13: multi-scale fusion,
300: multi-scale multi-view microscopy image processing system,
301: image,
302: CNN_A,
303-305: CNN_Bi
306: segmentation,
307: CNN_C,
308: low segmentation,
309: initial segmentation,
310: high segmentation,
311: global features,
312: multi-layer perception,
313: CNN_D,
314: CNN_E,
315: fuse,
316: new global features,
317: final segmentation,
318: connection switch,
319: concatenation, and
320: weighting, The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for detecting tissue lesions, the method comprising:
   receiving image data from a user interface, the image data including raw image data, passing the image data through at least one first convoluted neural network to compute low order features,
   passing the low order features through at least one second convoluted neural network to compute a course segmentation that is smaller than the raw image data,
   recovering a spatial resolution of the course segmentation by copying and concatenating the low order features into at least one third convoluted neural network to generate and compute an initial segmentation,
   concatenating and weighting data related to the initial segmentation and generating second image segmentation data, and
   analyzing the second image segmentation data thereby detecting tissue lesions if present.

2. The method of claim 1, wherein the image data includes a plurality of resolution scales, and the low order features include features independently computed for each of the resolution scales in the plurality of resolution scales.

3. The method of claim 1, wherein the initial segmentation data is course segmentation data, which is smaller than the raw image data, and each pixel of the course segmentation data indicates a class of corresponding areas in the raw image data.

4. The method of claim 1, wherein the initial segmentation data is computed based on a single image.

5. The method of claim 1, wherein the data related to the initial segmentation data is weighted by passing global features from different image views and scales to create a multi-layered perception.

6. The method of claim 1, wherein the passing of the image data through the at least one first convoluted neural network, the passing of the low order features through the at least one second convoluted neural network, and the analyzing is performed in real time.

7. The method of claim 1, wherein the received image data is from either or both of a microscopy image or a whole-slide image.

8. The method of claim 1, wherein the method further comprises classifying the detected tissue lesions into sub-categories.

9. The method of claim 1, wherein the method further comprises displaying analysis results.

10. The method of claim 9, wherein the analysis results are displayed on a computer or via augmented reality.

11. An apparatus comprising:
    at least one memory configured to store computer program code; and
    at least one processor configured to access the at least one memory and operate according to the computer program code, the computer program code comprising:
    receiving code configured to cause the at least one processor to receive image data from a user interface, the image data including raw image data,
    first passing code configured to cause the at least one processor to pass the image data through at least one first convoluted neural network to compute low order features second passing code configured to cause the at least one processor to pass the low order features through at least one second convoluted neural network to compute a course segmentation that is smaller than the raw image data, recovering code configured to cause the at least one processor to recover a spatial resolution of the course segmentation by copying and concatenating the low order features into at least one third convoluted neural network to generate and compute an initial segmentation, and refining code configured to cause the at least one processor to concatenate and weigh data related to the initial segmentation and generate second image segmentation data, and analyzing code configured to cause the at least one processor to analyze the second image segmentation data thereby detecting tissue lesions if present.

12. The apparatus of claim 11, wherein the image data includes a plurality of resolution scales, and the low order features include features independently computed for each of the resolution scales in the plurality of resolution scales.

13. The apparatus of claim 11, wherein the initial segmentation data is course segmentation data, which is smaller than the raw image data, and each pixel of the course segmentation data indicates a class of corresponding areas in the raw image data.

14. The apparatus of claim 11, wherein the first passing code is further configured to compute the initial segmentation data based on a single image.

15. The apparatus of claim 11, wherein the refining code is further configured to weight the data related to the initial segmentation data by passing global features from different image views and scales to create a multi-layered perception.

16. The apparatus of claim 11, wherein the receiving code, the first passing code, and the refining code are configured to be operated in real time.

17. The apparatus of claim 11, wherein the received image data is from either or both of a microscopy image or a whole-slide image.

18. The apparatus of claim 11, wherein the computer program code further comprises classifying code configured to cause the at least one processor to classify the detected tissue lesions into sub-categories.

19. The apparatus of claim 11, wherein the computer code further comprises displaying code configured to cause the at least one processor to display analysis results.

20. A non-transitory computer-readable medium storing instructions, the instructions comprising: one or more instructions that, when executed by one or more processors of a device, cause the one or more processors to:

receive image data from a user interface, the image data including raw image data, pass the image data through at least one first convoluted neural network to compute low order features pass the low order features through at least one second convoluted neural network to compute a course segmentation that is smaller than the raw image data, recover a spatial resolution of the course segmentation by copying and concatenating the low order features into at least one third convoluted neural network to generate and compute an initial segmentation concatenate and weigh data related to the initial segmentation and generating second image segmentation data, and analyze the second image segmentation data thereby detecting tissue lesions if present.

\* \* \* \* \*